Oct. 15, 1957  E. H. BARTELINK  2,810,126
PLAN POSITION INDICATOR
Filed Sept. 17, 1945  5 Sheets-Sheet 1
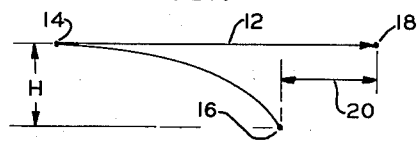
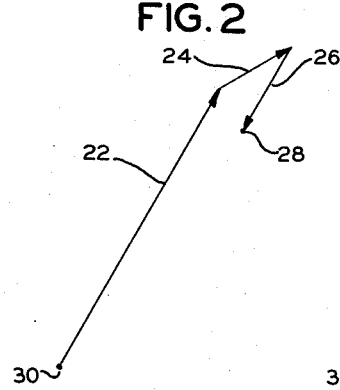
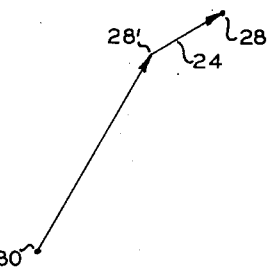
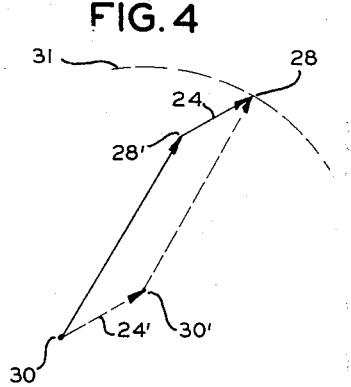
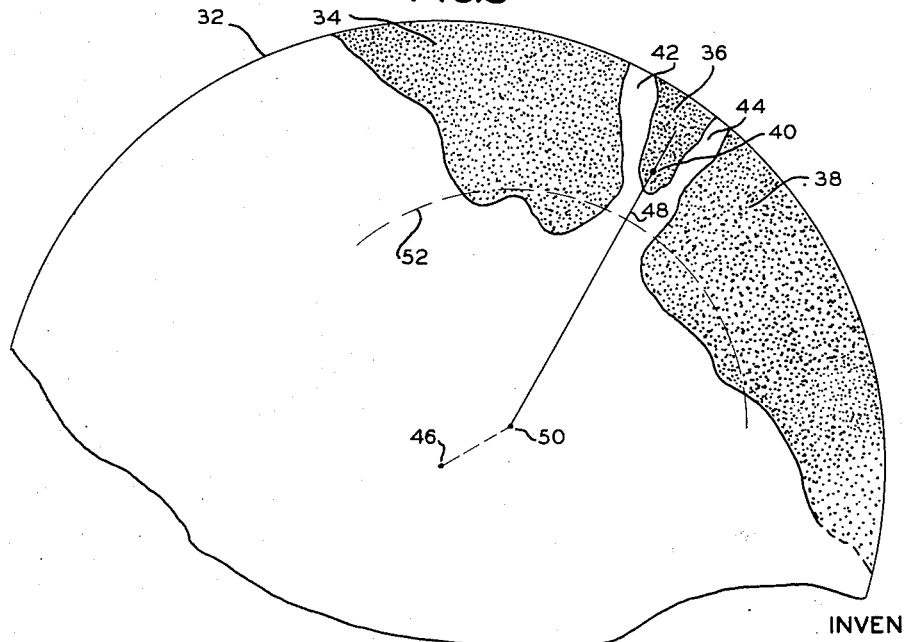
INVENTOR
EVERHARD H. BARTELINK
BY
ATTORNEY Oct. 15, 1957     E. H. BARTELINK     2,810,126
PLAN POSITION INDICATOR Filed Sept. 17, 1945     5 Sheets-Sheet 2

INVENTOR
EVERHARD H. BARTELINK

BY

ATTORNEY

Oct. 15, 1957 E. H. BARTELINK 2,810,126
PLAN POSITION INDICATOR
Filed Sept. 17, 1945 5 Sheets-Sheet 3

INVENTOR
EVERHARD H. BARTELINK
BY
ATTORNEY

Oct. 15, 1957     E. H. BARTELINK     2,810,126
PLAN POSITION INDICATOR

Filed Sept. 17, 1945     5 Sheets-Sheet 4

INVENTOR
EVERHARD H. BARTELINK

BY

ATTORNEY

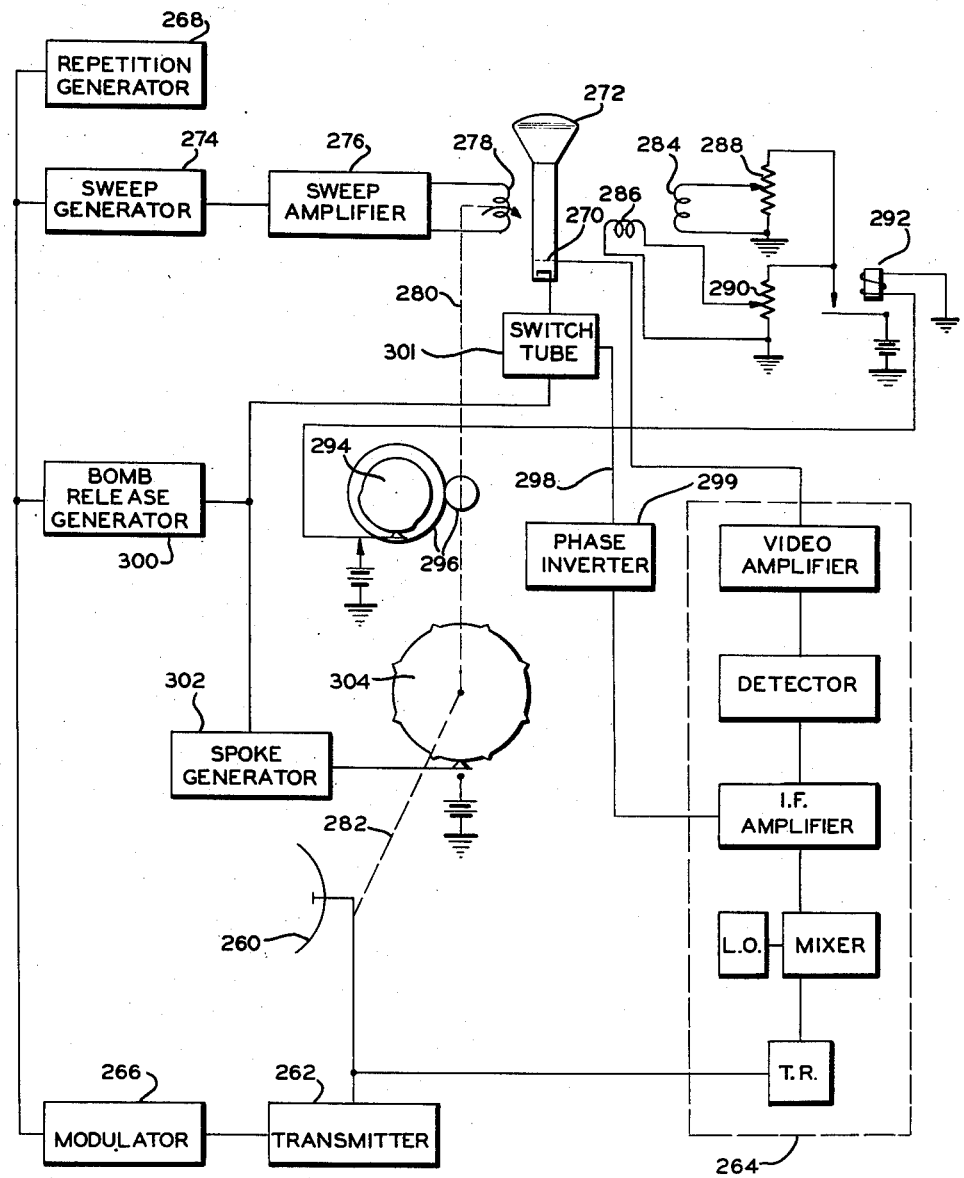

United States Patent Office 2,810,126
Patented Oct. 15, 1957

2,810,126

PLAN POSITION INDICATOR

Everhard H. Bartelink, Cambridge, Mass., assignor, by mesne assignments, to the United States of America as represented by the Secretary of the Navy Application September 17, 1945, Serial No. 616,921

8 Claims. (Cl. 343—11)

This invention relates to radio pulse echo systems, and more particularly to plan position indicator systems.

One object of the invention is to generally improve such systems.

A more particular object of the invention is to present a plurality of simultaneously visible indications about a plurality of mutually displaced centers on a single oscilloscope screen. In most practical applications of the invention one of these indications will be a ground map, and the other will be a range and angle marker, or a plurality of markers making up a grid.

Another object of the invention is to apply the foregoing to the bombing of a target from aircraft, allowing for wind or drift, or/and allowing for displacement of the desired target from a well recognizable pulse reflection point used as a reference point. In accordance with the present invention the bombardier is given a "virtual" bomb release point to work with in the simple direct manner of a real bomb release point in the absence of wind.

Still another object of the invention is to make it readily possible to measure the range and angle between two points in a map presented on an indicator screen, neither of which points is at the origin of the map.

A further object of the present invention is to provide several forms of apparatus embodying the invention and fulfilling the foregoing objects.

To accomplish these and other more specific objects which will hereinafter appear, my invention resides in the method and apparatus elements, and their relation one to the other, as are hereinafter more particularly described in the following specification. The specification is accompanied by drawings in which:

Fig. 1 is a diagram taken in a vertical plane, and illustrates trail distance;

Figs. 2 and 3 are drawn in plan, and are explanatory of the allowance made for wind or drift error;

Fig. 4 illustrates the virtual release point;

Fig. 5 shows the same applied to a bombing problem;

Fig. 15 is a block diagram explanatory of a modified form of the invention.

Figure 6:
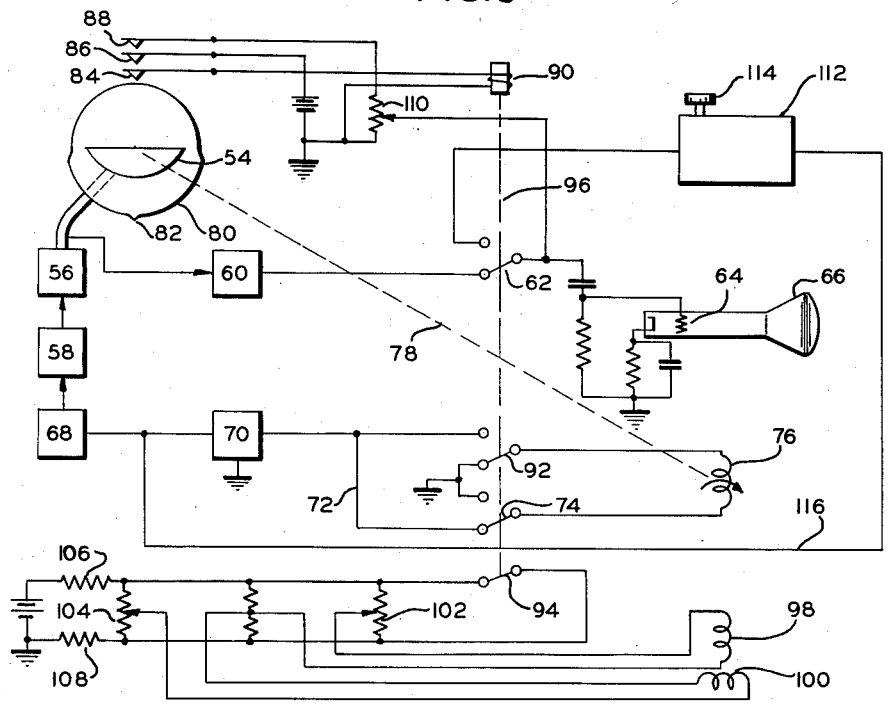
Fig. 6 is a schematic diagram of apparatus which may be used for bombing.

In the several forms of my apparatus two pictures are presented on a single screen, in such a manner that the origin of the radial sweeps of the cathode ray tube beam is different in each case. This is done by a "jumping center" arrangement, with auxiliary deflecting means which come into operation periodically to offset the center.

Inasmuch as the invention may take a number of different forms best adapted for a number of different applications of the invention, the description which follows will be in terms of some of these specific applications. The first is the bombing of a target from an aircraft, at night or through an overcast.

Referring to the drawing, and more particularly to Fig. 1, an aircraft is assumed to be flying on a horizontal path 12 at a known velocity and altitude. If a bomb is released at a bomb release point 14 it will follow a known trajectory and strike a ground target at point 16. The time of fall of the bomb is known $$\left(T = \sqrt{\frac{2H}{g}} \text{ in which } H \text{ is the altitude}\right)$$

and during this time the aircraft will have travelled to a point 18. The distance 20 that the aircraft travels beyond the target is called the "trail."

While approaching the target the magnitude and direction of the wind are determined, and an allowance for wind or drift error is made in the vector diagram of Fig. 2, in which vector 22 (corresponding to line 14, 18 of Fig. 1) represents the heading of the aircraft from the release point, its length being the distance travelled by the aircraft during the time of fall of the bomb in still air; the vector 24 represents the wind or drift error, its length being the wind velocity times the time of fall; and the vector 26 represents the trail. For a target located at 28, the point 30 is the bomb release point. Inasmuch as vectors 22 and 26 have the same direction, their difference may be plotted directly, thus resulting in the somewhat simpler vector diagram shown in Fig. 3, in which 30 is the bomb release point for a target at 28. It will be understood that in the absence of wind, 30 would be the bomb release point for a target located at 28'.

The vector diagram of Fig. 3 may be completed as a parallelogram, as shown in Fig. 4. It will be seen that target 28 may be struck by simulatedly releasing the bomb at a "virtual" bomb release point 30', provided that the compensation for wind is taken care of by a proper displacement between the bomb release point 30 and the virtual bomb release point 30', the vector 24' being equal and parallel to the vector 24. This simplifies the task of the bombardier, who may operate as though there were no wind. A so-called "bomb release circle" is shown at 31, this being drawn about point 30' as a center, with a radius equal to the vector 30, 28'. The bomb is released when the target is brought at the intersection of the vector 30', 28 and the arc 31.

Referring now to Fig. 5, assume that 32 is the screen of a cathode ray oscilloscope, and that as the target is approached, it reveals a ground picture consisting of land masses 34, 36, and 38, with the desired target 40 at the confluence of rivers 42 and 44. The center 46 of the ground map is the true location of the bombing plane. If a direction line or heading marker 48 is traced on the screen in the direction of the heading of the aircraft, but not from the point 46 but rather from an offset center 50 which is displaced by an amount compensating for the wind or drift error, the point 50 may be considered the virtual position of the aircraft, which is the position from which it would approach in the absence of wind. A range mark may be provided on the heading marker 48, or more preferably an arc or circle 52 the radius of which corresponds to the horizontal range between the points 14 and 16 of Fig. 1, or the vector 30', 28 in Fig. 4. As the airplane continues its flight, the bombardier gives the pilot any necessary instructions which will keep the target 40 moving down the heading marker 48 toward the bomb release circle 52. When the target reaches the bomb release circle 52 the bombardier releases the bomb. His operation at the time of release is as simple and direct as though he were operating in still air.

Apparatus for the foregoing purpose is schematically illustrated in Fig. 6. Inasmuch as a ground map of the area ahead of the aircraft is all that is of interest, for the present purpose, a part of the rotation of the antenna toward the rear may be used to provide a time interval during which the heading marker and bomb release circle are presented on the screen. In Fig. 6 the antenna and reflector assembly is indicated at 54, and is connected to a conventional transmitter 56 and modulator 58. It is also connected to a conventional receiver 60, which may include the usual TR box, local oscillator, mixer, intermediate frequency amplifier, detector, and video amplifier. The output of the video amplifier is fed through a switch 62 to the intensity grid 64 of a cathode ray oscilloscope 66. The modulator 58 of the transmitter is controlled by a pulse repetition generator 68, and this is also used to time the sweep of the oscilloscope, as by means of a deflection or saw tooth generator 70 the output of which is supplied through conductor 72 and switch 74 to a deflection coil 76. This is rotated with the antenna 54, as by means of a synchronous drive here represented by the dotted line 78.

In accordance with the present invention the antenna 54 is provided with a switching cam having a long rise 80, and a short auxiliary rise 82. These cams operate on switch contacts 84, 86 and 88. During the forward half of the scan the contacts remain open, but during the back half of the scan the cam 80 closes contacts 84, 86, thereby energizing a relay coil 90, which moves switches 62, 92, 74 and 94, these switches being interconnected by linkage 96, here indicated by a dotted line.

The movement of switch 94 offsets the center of the sweep. In the present case this is done by means of two stationary deflection coils 98 and 100 disposed at right angles to each other, these being so called north-south and east-west coils. The deflection produced by the north-south coil 98 may be adjusted, as by means of a potentiometer 102, and similarly the deflection produced by the east-west coil 100 may be adjusted, as by means of the potentiometer 104. During the forward scan the coils 98 and 100 are inoperative because switch 94 short-circuits the potentiometers 102 and 104. Excessive current drain is prevented by the series resistors 106 and 108. However, during the back scan, switch 94 is opened and the center is biased or offset to the desired new position. It will be understood that the potentiometers 102 and 104 may be provided with suitable control knobs having scales calibrated in terms of distance, and these are so adjusted by the operator as to provide coordinates resulting in the desired offset for wind direction, wind velocity, and time of fall.

When the cam point 82 reaches the contacts it closes contacts 86 and 88, thereby energizing potentiometer 110, and so applying a positive bias to the intensity grid 64. This produces the heading marker, and for this purpose the cam 82 points in a direction directly opposite that of the antenna.

Inasmuch as it is desired to have the heading marker (and also the bomb release arc) appear on the forward part of the screen or ground map, the effect of the rotating deflection coil 76 is reversed during the back scan. This is accomplished by the switches 74 and 92 which when switched from the lower portion shown to the upper position, cause the sweep current from the deflection generator 70 to flow through switch 92 and downward through coil 76 to ground, instead of through switch 74 and upward through the coil to ground.

The bomb release circle (actually only a semi-circle) is obtained by brightening the cathode ray spot at a desired distance or range from the offset center. Fig. 6 includes a rectangle 112 which represents a bomb release range marker, and which is provided with an appropriate control knob 114 having a suitable scale calibrated in terms of range. This provides a range pip which is applied to the intensity grid 64 of the oscilloscope when the switch 62 has been moved to the upper position by relay 90.

Figure 7:
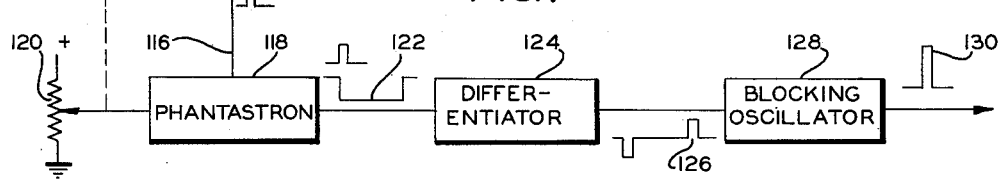
Fig. 7 shows a part of the apparatus of Fig. 6 in greater detail.

The range pip may be provided in several ways, a preferred one of which is illustrated in Fig. 7. This includes a so-called "phantastron" or voltage controlled delay multivibrator 118 which is supplied with repetition rate pulses through lead 116. This lead goes back to the repetition rate oscillator 68 shown in Fig. 6. The control voltage for the phantastron 118 is obtained from a potentiometer 120, adjustable by means of the control knob 114 previously mentioned. The output of the phantastron is a gate 122 the length of which is a measure of time, and is dependent on the adjustment of the potentiometer 120. This gate is differentiated in a suitable differentiating circuit 124, and the positive or trailing peak 126 is then used to control a blocking oscillator 128, the output of which is a pip 130 properly timed relative to the input pulse to act as a measure of range. The repetition of this pip during the back scan traces in the bomb release circle.

Figure 8:
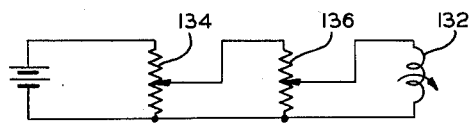
Fig. 8 shows modified apparatus for compensating for wind or drift error.

A modified scheme for introducing the amount of offset for the wind correction is shown in Fig. 8. This involves the structural addition of a single rotatable yoke coil instead of the two fixed coils 98 and 100 shown in Fig. 6. The single coil 132 of Fig. 8 is angularly adjustable to establish an angular position corresponding to the wind direction. The potential applied thereacross equals the wind correction, which depends upon the wind velocity and the time of fall. Two potentiometers 134 and 136 are arranged in succession, so that the output potential is proportional to the product. One of these potentiometers is calibrated in terms of wind velocity, while the other introduces the element of time, preferably by means of calibration in terms of aircraft altitude. Thus the operator simply introduces the wind velocity on a suitable scale associated with potentiometer 134; the altitude on a suitable scale associated with the potentiometer 136; and the wind direction on a suitable scale which rotates the coil 132.

Figure 9:
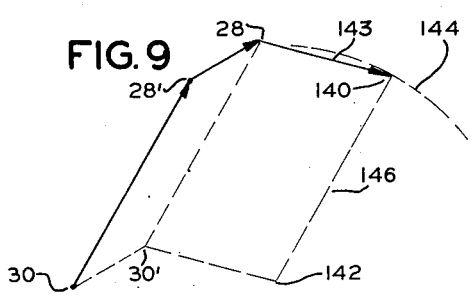
Fig. 9 is a vector diagram explanatory of the application of the invention to reference bombing.

The apparatus so far described may also be used for reference bombing. The underlying idea is illustrated in Fig. 9 in which the aircraft position is shown at 30, while the target position is shown at 28. In the absence of wind, the release point 30 would correspond to a target position at 28' but allowing for wind or drift error, the virtual release point is 30'. If it be assumed now that the target is such as not to provide a clear echo, but that a reference point 140 is known to provide a good echo, an additional correction may be inserted corresponding to the vector 143, and compensating for the displacement between the true target 28 and the reference target 140. In such case the virtual reference release point will be 142, and a bomb release circle 144 may be described about the point 142, instead of about the point 30'. In such case the bombardier will guide the pilot to cause the reference target 140 to move down the heading marker 146 until the reference target reaches the bomb release circle 144, whereupon the bomb is released. It is unnecessary for the bombardier to be cognizant of the fact that at this time the plane is really located at the release point 30, and that the bomb will strike a target at 28. In operation the treatment of the problem is as though the plane were at 142 and the target at 140, i. e. as if there were no wind and no target displacement.

In the foregoing it has been assumed that the reference point and the target are in the same screen sector during the approach of the aircraft. To lessen the possibility of the reference point being in another sector of the screen, a reduced sector may be used which misses both the target and the reference point, this reduced sector being kept adequate, however, to introduce the heading marker and bomb release arc. In such case the cam 80 in Fig. 6 would not occupy half of the scan rotation, a smaller sector making it possible to present more of the ground map. Moreover, if desired the entire ground map may be shown, and the heading marker and bomb release arc may be drawn in by other means described later in the specification.

Before concluding this description of the bombing apparatus, it may be stated that so far it has been assumed that an undistorted ground map is obtained, this being possible by using an appropriate ground range sweep system. However it is not essential to so restrict the apparatus, it being sufficient if the center-to-center displacement lies in an undistorted representation of the region of interest. This includes the centers and also the intersection of the heading marker and the bomb release circle. When the target appears at the edge of the screen there may be some distortion, and in consequence the plane may not be guided by the most direct possible route toward the virtual target. However, as the target moves in towards the center of the screen the distortion decreases, and the heading of the aircraft becomes more and more correct, until finally at the release point both the distortion and the deviation from the correct heading are zero. The bombardier may believe he is guiding the pilot straight for the target along the heading marker.

In the foregoing discussion it has also been assumed that the oscilloscope presentation is stabilized in azimuth, that is, the ground map is for convenience always presented "north-up." This is a common feature which is easily available, but it is not essential, and the screen indication may be "ahead up" instead.

Figure 10:
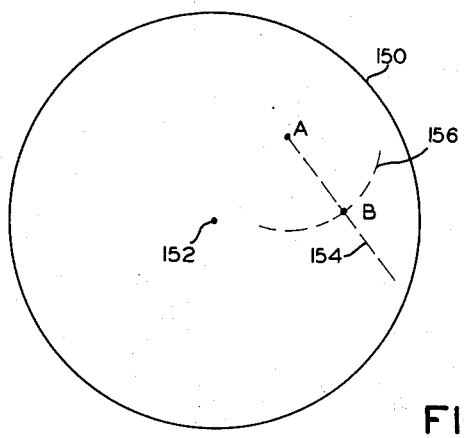
Fig. 10 illustrates another use of the invention.

For some purposes it may be more desirable to present a complete ground map. One example has already been mentioned, namely, for complete freedom of choice when reference bombing. Another example is shown in Fig. 10, in which a screen 150 has a ground map (not shown) traced thereon about a center 152 corresponding approximately to the geometric center of the screen. Points A and B are of interest, and it is desired to find the direction and range of point B from point A. For this purpose the center is jumped from the point 152 to the point A, and from the new center A a heading marker 154 is drawn and is so orientated as to run through the point B. A range mark or a range arc 156 is then moved along the heading marker 154 until it is located at the point B, whereupon both the direction and the range from the point A to the point B may be read on some suitably calibrated scales.

Figure 11:
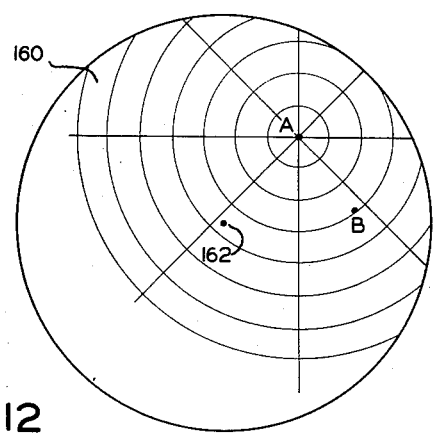
Fig. 11 shows a modification.

In some cases it may be more convenient to present a number of direction marks and range circles, making up a grid. This is illustrated in Fig. 11 in which a ground map (not shown) is traced on the screen 160 about a center 162. The center is jumped from the point 162 to the point A and a complete grid is drawn on the screen about the point A. The bearing and range of point B from point A may then be read on the grid.

Figure 12:
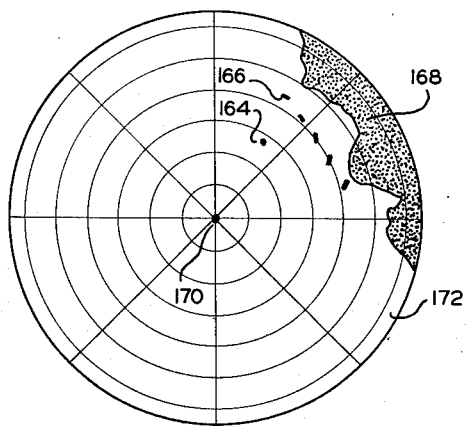
Fig. 12 illustrates still another modification in which the origin of the ground map is displaced from the center of the screen.

It should be understood that it is not essential that the origin of the ground map be located at the geometrical center of the screen, or that the origin of the grid or direction marker be displaced from the center of the screen. In fact, it is not essential that either origin be at the center of the screen, but ordinarily it is convenient to have one of them at that point. In Fig. 12 the origin of the grid is located at the geometrical center of the screen, and the origin 164 of the ground map is displaced therefrom.

This arrangement is of particular value for a system in which airborne search equipment is used for early warning, and picks up a picture which is repeated back at the flagship of a fleet. In such case it is convenient for those on board the ship to know the bearing and range of the detected objects with reference to the ship. Thus in Fig. 12 an aircraft located at 164 carries search equipment which reveals a column of ships 166 moving along a coast line 168. The information is transmitted to the flagship at 170. The screen 172 of the ship-carried indicator is provided with a polar grid about the point 170, while the ground map is traced in about a point 164 which is offset from the point 170 by an amount corresponding to the bearing and distance of the search aircraft from the ship. In this way the column of ships 166 and the coast line 168 are seen directly in proper relation to the position of the ship 170.

For the purposes described in connection with Figs. 10, 11 and 12 it may be preferred to show the entire ground map, with no sector missing as in the case of Fig. 6. One method of accomplishing this may be explained with reference to Fig. 13, in which the normal sawtooth sweep of a plan-position-indicator is shown by curve 174. If a first sweep takes place at 176, the next sweep takes place at 178, with a substantial dwell period 180 between the sweeps. The center may be jumped between the sweeps 176 and 178, and while the center is jumped a delayed sweep may be provided, as is indicated at 182. The delayed sweep wave may be exactly like the sweep wave 176, 178, but is so displaced in phase that the auxiliary sweeps take place between the normal sweeps. The desired changes may be controlled by a special switching voltage or gate indicated at 184 in Fig. 13, said gate starting at the termination of sweep 176 and finishing before the beginning of the next sweep 178.

Figure 14:
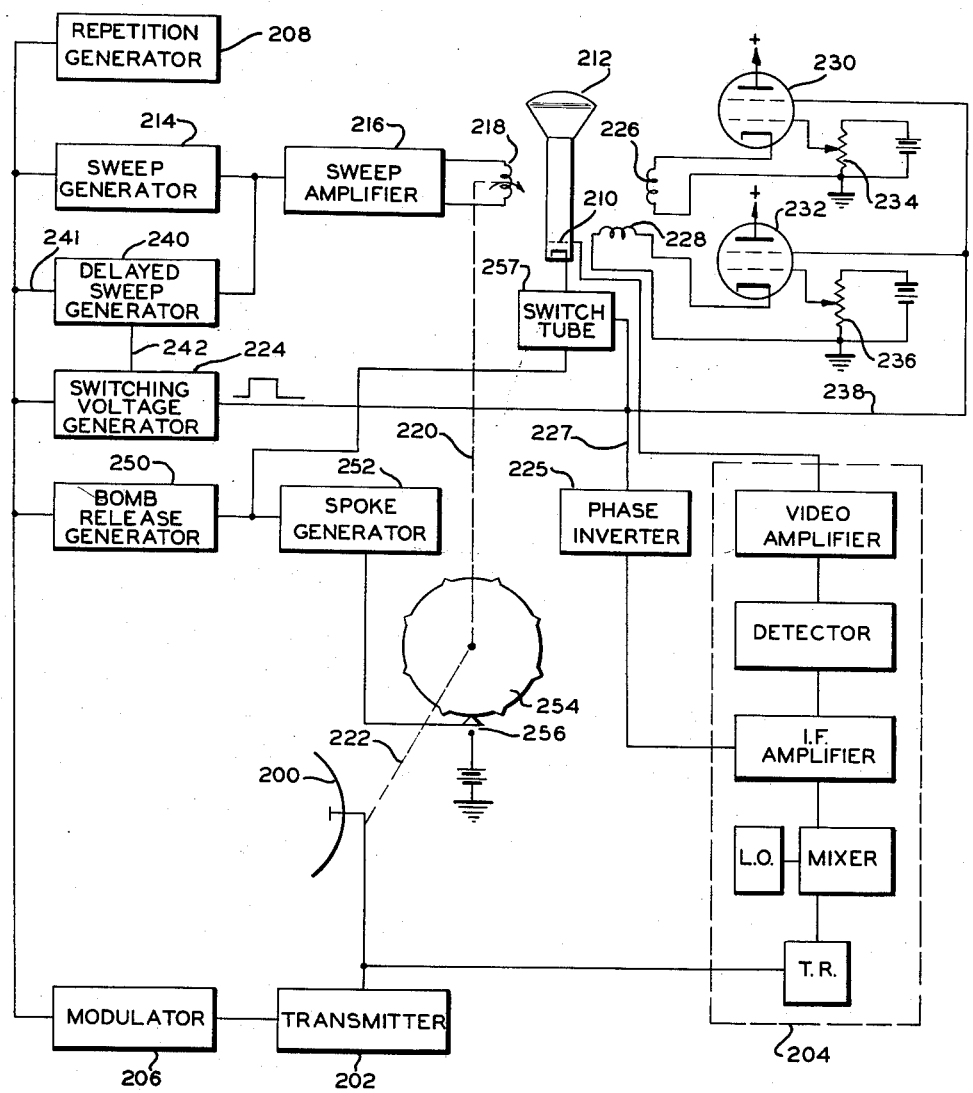
Fig. 14 is a block diagram explanatory of apparatus operating in accordance with Fig. 13.

Apparatus for this purpose is schematically illustrated in Fig. 14, referring to which the antenna 200 is connected to both the transmitter 202 and the receiver 204. The transmitter is modulated by a modulator 206 timed by a repetition generator 208. The receiver 204 includes the usual TR box, local oscillator, mixer, intermediate frequency amplifier, detector, and video amplifier, and its output is applied to the intensity grid 210 of a cathode ray tube 212.

The repetition generator 208 also times a sweep generator 214, followed by a sweep amplifier 216, the output of which is fed to a rotating deflection coil 218. This is rotated in synchronism with the antenna 200, by appropriate means schematically indicated by the broken lines 220 and 222.

Figure 13:
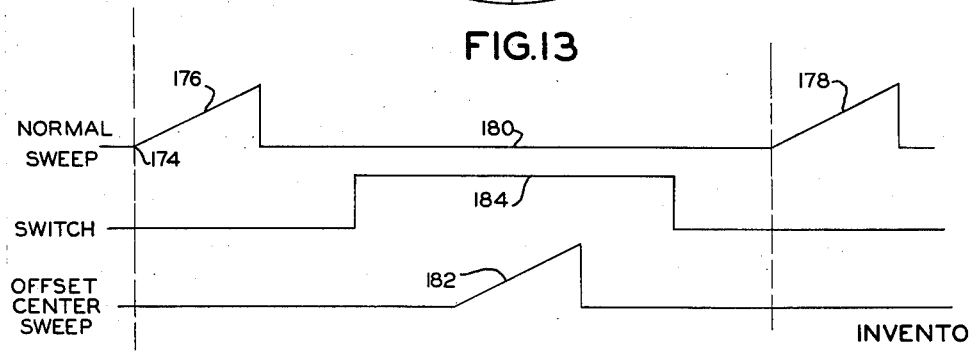
Fig. 13 is explanatory of a modified apparatus in which one of the indications is developed by delayed sweeps coming between the normal sweeps of the ground map.

The repetition generator 208 is also connected to a circuit indicated at 224 for generating the switching voltage (184 in Fig. 13). This is essentially a short gate so delayed after the repetition pulse as to locate the gate between the normal sweeps provided by the sweep generator 214.

The first function of the switching voltage is to jump the center, and this is done by means of a pair of stationary coils 226 and 228, the current supply to which is controlled by switch tubes 230 and 232. In the illustrated example these are tetrodes, the control grids of which are biased by potentiometers 234 and 236, the control handles of which may have scales graduated in distance. The adjusted distances correspond to the north-south and east-west components of the offset between centers. The other grids are connected by means of conductor 238 to the switch voltage generator 224. The tubes are conductive during the positive gate only. The amount of deflection depends on the bias put on the control grids, but when the switching voltage is negative the tubes are cut off altogether, and the normal center is restored.

The apparatus further includes an auxiliary sweep generator 240. This provides the delayed sweep, and special delay means may be included in the generator 240, with a connection at 241, or a connection 242 may be made from unit 224 to sweep generator 240 so that the switch voltage is itself used to time the auxiliary sweep. The auxiliary sweep is then passed through the sweep amplifier 216 to the rotating deflection coil 218.

Instead of an auxiliary sweep generator the regular sweep generator 214 may be used at double frequency. The repetition frequency from generator 208 is doubled, and the double frequency is used to time the sweep generator 214. However, a separate sweep generator provides somewhat more flexibility in timing and adjustment.

The switch voltage from unit 224 is used for a third purpose, namely, to paralyze the receiver 204, during the interval between normal sweeps. For this purpose some of the grids, for example in the intermediate frequency amplifier, are made negative. A phase inverter 225 is inserted in lead 227 to provide the desired negative switching voltage. In the interval while the receiver output is shut off, an element of the polar grid is put on the screen.

To compose the polar grid I provide two generators 250 and 252. The generator 250 provides pips at one or more desired ranges, and thus provides one or more range circles. These are timed with relation to the repetition generator 208, and are fed to the cathode of the tube in negative phase. The generator 252 is a "spoke" generator to indicate angle of direction, and may be controlled by a mechanical switch arrangement including a cam disc 254 having multiple camming projections operating on contacts 256. The disc 254 is rotated in unison with the antenna and the deflection coil, and each time the contacts 256 are closed a suitable voltage is applied to the cathode of the tube 212 to intensify the beam.

The switching voltage is used for a fourth purpose, namely, to control the feed of the generators 250 and 252 to the cathode of the oscilloscope. For this purpose the switching voltage is fed to the grid of a switch tube 257, thru which the output of the generators 250 and 252 is also passed. During the normal sweep intervals the switch tube 257 is nonconductive, but when the center is offset, the tube 257 is conductive. This is for Figs. 10 and 11. For Fig. 12 the phase relations are rearranged to develop the polar grid on the normal center, and to develop the map on the offset center. This is done by a phase inverter (not shown) inserted in lead 238.

The arrangement of Fig. 14 has the advantage that the two indications are composed on the screen substantially concurrently. However, a complete auxiliary indication may be interleaved with a complete regular indication at much longer intervals, as by using every second or third or fourth scan for the auxiliary picture. Such an arrangement is simple mechanically, but suffers from the disadvantage of requiring a very high persistence screen, or/and high scanning speed.

Apparatus of this type is schematically shown in Fig. 15, and referring to that figure the pulse echo system as before comprises an antenna 260 connected to a transmitter 262 and receiver 264. The transmitter is modulated by a modulator 266 timed by a repetition generator 268. The receiver 264 includes the usual TR box, local oscillator, mixer, intermediate frequency amplifier, detector, and video amplifier, and its output is connected to the intensity grid 270 of the cathode ray tube 272. The repetition generator 268 times a sweep generator 274, the output of which is amplified at 276, and supplied to a rotating deflection coil 278 which is rotated in unison with antenna 260, as by means of a synchronous system here represented by dotted lines 280 and 282.

The center is periodically offset by means of stationary north-south and east-west deflection coils 284 and 286, the currents through which are adjusted by appropriate potentiometers 288 and 290, which are preferably calibrated in distance. The energization of the auxiliary coils may be timed by a relay 292, the coil of which is energized under control of a cam 294 driven through appropriate reduction gearing 296 by the antenna 260 or/and deflection coil 278. The length of the rise on cam 294, and the reduction gear ratio, determine what proportion of the scanning time will be used for the auxiliary indication.

For example, 180° cam rise is used with a gear ratio of 1 to 2; 120° cam rise is used with a gear ratio of 1 to 3, and 90° cam rise is used with a gear ratio of 1 to 4.

The cam controlled current which offsets the center is also connected by conductor 298 and phase inverter 299 to the receiver 264, in order to paralyze the same during the presentation of the offset indication. It is further used to control the switch tube 301, which times the supply from range circle generator 300 and spoke generator 302 to the cathode of oscilloscope 272. Range circle generator 300 is timed by the repetition generator 268. The spoke generator is timed by a cam disc 304, turned with the synchronous system 280, 282.

It is believed that the method of my invention, the construction of apparatus for effectuating same, as well as the advantages thereof, will be apparent from the foregoing detailed description. Multiple images are presented for simultaneous observation on a single indicator screen, these images being developed about controllably offset centers. Either indication may be centered at the geometric center of the screen, but this is not essential. Either the screen centered indication, or the offset indication, may be a ground map, and the other may be one or more direction and range markers, or a complete grid. Such an arrangement is of value for numerous purposes, such as allowing for drift error or for reference point displacement when bombing, or for determining the direction and range between any two points both offset from the center of the ground map, or for a surface vessel receiving a ground map from an observation plane in advance of the vessel.

The auxiliary indication may be presented during a sector of each scan, or during one complete scan out of several, or during the interval between the maximum useful range and the beginning of the next sweep, that is, during the interval between successive normal sweeps of the cathode ray beam.

It will be understood that while I have shown and described my invention in several preferred forms, many changes may be made in the methods and structures disclosed, without departing from the spirit of the invention, as sought to be defined in the following claims.

I claim:

1. In a radio pulse echo plan position indicator system of the type having a cathode ray indicator wherein the ray is deflected radially and in rotation from a reference center and intensified in response to radio pulse echoes to trace a luminous screen image, apparatus for determining the range and direction between two points on said image, both differing from said reference center, comprising, means for shifting said reference center periodically to one of said points, and means deflecting and intensifying said ray to trace range and direction markers from said shifted reference center.

2. In radio pulse echo plan position indicator apparatus, a cathode ray indicator having a luminous screen, means for deflecting the ray of said indicator from a reference center in response to voltages from said radio pulse echo apparatus to trace on said screen a luminous image, means for deflecting the ray of said indicator to trace on said screen luminous lines representing range and direction markers from a common point of origin, means to shift the location of said point of origin to a predetermined point with respect to said reference center, and a switch for alternately tracing said image and said markers at sufficiently frequent intervals for the traces to appear continuous, whereby range and direction may be determined between two points on said image both differing from said reference center.

3. In a radio pulse echo plan position indicator, a cathode ray indicator having a luminous screen, radio pulse transmitting and pulse echo receiving apparatus including a rotatable directional antenna, a rotatable deflection coil adapted to deflect said cathode ray magnetically, a source of timed voltages synchronized to said pulse transmitting apparatus, means to rotate said antenna and said coil in synchronism, means to energize said coil from said source, means to apply echo pulses from said receiving apparatus to said indicator to intensify said ray to trace on said screen an image representing a ground map about the position of said radio apparatus as a center, auxiliary deflecting coils adapted to deflect said ray magnetically, means to energize said auxiliary coils periodically to offset said cathode ray a predetermined amount, and means to apply voltages to deflect and intensify said offset ray to trace range and bearing marker lines while said auxiliary coils are energized.

4. In a radio pulse echo plan position indicator, a cathode ray indicator having a luminous screen, radio pulse transmitting and pulse echo receiving apparatus including a directional rotatable antenna, a rotatable deflection coil adapted to deflect said cathode ray magnetically, a source of saw-tooth voltages synchronized to said pulse transmitting apparatus, means to energize said coil from said source to provide deflections of said ray representing range, means to rotate said antenna and said deflection coil synchronously to represent direction, means to apply echo pulses from said receiving apparatus to said indicator to intensify said beam to trace on said screen an image representing a ground map about the position of said radio apparatus as a center, an auxiliary pair of deflection coils fixed at right angles to each other and adapted to deflect said ray magnetically, means to energize said auxiliary coils periodically to offset said cathode ray an adjustable predetermined amount, and means to apply voltages to said indicator to deflect and intensify said ray to trace on said screen range and bearing marker lines while said auxiliary coils are energized.

5. In a radio pulse echo plan position indicator apparatus for navigating a bombing plane to a target, a cathode ray indicator having a luminous screen, means for deflecting said ray in response to voltages from said apparatus to trace an image representing a ground map about the position of said plane as a center, means for applying voltages to said indicator to trace a line marker representing the direction of heading of said plane and a circular marker representing a bomb release circle, means to adjust the position of said line marker and said circular marker with respect to said image by an amount representative of wind or drift error, and a switch for alternately tracing said image and said markers, whereby said plane may be guided so that the image point representing the target appears to move along said line marker toward said circular marker to provide a bomb release point compensated for wind or drift error.

6. In a radio pulse echo plan position indicator apparatus for navigating a bombing plane to a target, a cathode ray indicator having a luminous screen, radio pulse transmitting and pulse echo receiving apparatus including a rotatable directional antenna, a rotatable deflection coil adapted to deflect said cathode ray magnetically, a source of saw-tooth voltages synchronized to said pulse transmitting apparatus, means to energize said coil from said source to provide deflections of said ray representing range, means to rotate said antenna and said coil synchronously to represent direction, means to apply echo pulses from said receiving apparatus to said indicator to intensify said ray to trace on said screen an image representing ground map about the position of said plane as a center, an auxiliary pair of deflection coils fixed at right angles to each other and also adapted to deflect said ray magnetically, means to energize said auxiliary coils periodically to offset said cathode ray in amount and direction representing wind or drift error, and means to apply voltages to said indicator during the period of energizing said auxiliary coils to deflect and intensify said ray to trace on said screen a line marked indicating the direction of heading of said plane and a circular marker representing a bomb release circle, whereby said plane may be guided so that the image point representing the target appears to move along said line marker toward said circular marker to provide a bomb release point compensated for wind or drift error.

7. In a radio pulse echo plan position indicator apparatus for navigating a bombing plane to a target by use of a reference point which provides a clear pulse echo, a cathode ray indicator having a luminous screen, means for deflecting said ray in response to voltages from said apparatus to trace an image on said screen representing a ground map about the position of said plane as a center, means for applying voltages to said indicator to trace a line marker representing the direction of heading of said plane and a circular marker representing a bomb release circle, means to adjust the position of said line marker and said circular marker with respect to said image in amount and direction representative of wind or drift error plus the displacement between the true target and said reference point, and a switch for alternately tracing said image and said markers, whereby said plane may be guided so that the image point representing the reference point pulse echo appears to move along said line marker toward said circular marker to provide a bomb release point compensated for wind or drift error and said target displacement from said reference point.

8. In a radar relay system in which radar data is collected and transmitted through a radio link from a remote station to a display point, display apparatus comprising a cathode ray indicator having a luminous screen, means for applying voltages to said indicator to deflect and intensify said ray to trace lines on said screen representing range and direction markers about a point representing the location of said display point, means responsive to said radar data to apply voltages to said indicator deflecting and intensifying said ray to trace an image about an origin on said screen to represent a ground map centered about the position of said remote station, means to displace the origin of said image to a point representing the location of said remote station with respect to said display point, and a switch for alternately tracing said image and said markers at sufficiently frequent intervals for the traces to appear continuous whereby a ground map is displayed centered about said display point.

References Cited in the file of this patent

UNITED STATES PATENTS

| | | |
|---|---|---|
| 2,183,634 | Zworykin | Dec. 19, 1939 |
| 2,206,777 | Kee | July 2, 1940 |
| 2,251,984 | Cleaver | Aug. 12, 1941 |
| 2,262,033 | Moseley | Nov. 11, 1941 |
| 2,262,245 | Moseley | Nov. 11, 1941 |
| 2,371,606 | Chafee et al. | Mar. 20, 1945 |
| 2,400,232 | Hall | May 14, 1946 |
| 2,401,432 | Luck | June 4, 1946 |
| 2,403,562 | Smith | July 9, 1946 |
| 2,405,231 | Newhouse | Aug. 6, 1946 |
| 2,406,861 | Springer | Sept. 3, 1946 |
| 2,409,456 | Tolson | Oct. 15, 1946 |
| 2,426,189 | Espenschied | Aug. 26, 1947 |
| 2,426,658 | Wooldridge | Sept. 2, 1947 |
| 2,459,482 | Bond | Jan. 18, 1949 |
| 2,480,208 | Alvarez | Aug. 30, 1949 |